United States Patent
Odom et al.

Patent Number: 6,141,116
Date of Patent: Oct. 31, 2000

[54] SYSTEM AND METHOD FOR SECURED TRANSMISSION OF DATA OVER TELEPHONE COMMUNICATIONS SYSTEM

[75] Inventors: Gregory Glen Odom, Grand Prairie; William D. Kitchen, Dallas, both of Tex.

[73] Assignee: Lincoln Investment Limited, United Kingdom

[21] Appl. No.: 08/840,223

[22] Filed: Apr. 11, 1997

[51] Int. Cl.$^7$ .................................. H04N 1/00; H04N 1/44
[52] U.S. Cl. ............................................. 358/404; 380/18
[58] Field of Search .................................. 358/404, 434, 358/405, 435, 442; 380/9, 10, 17, 18, 20, 28, 46, 49, 55, 50; 364/200, 900, 551; 379/89, 100; 178/22.09, 22.08, 22.01; 340/825.34

[56] References Cited

U.S. PATENT DOCUMENTS

| | | | |
|---|---|---|---|
| 4,348,739 | 9/1982 | Deaver et al. | 364/900 |
| 4,578,530 | 3/1986 | Zeidler | 178/22.09 |
| 4,914,709 | 4/1990 | Rudak | 382/309 |
| 5,001,750 | 3/1991 | Kato et al. | 380/18 |
| 5,166,977 | 11/1992 | Ross | 380/18 |
| 5,398,283 | 3/1995 | Virga | 380/18 |
| 5,535,277 | 7/1996 | Shibata et al. | 380/28 |
| 5,608,786 | 3/1997 | Gordon | 379/100 |

OTHER PUBLICATIONS

Microsoft Press(R), Computer Dictionary, 2$^{nd}$ Edition, Copyright 1994, pp. 315,316,280, and 348.
Microsoft Press(R) Computer Dictionary, 3$^{rd}$ Edition Copyright 1997, pp. 262.
Stallings, Data & Computer Communications, Copyright @1991, pp. 123–126.

*Primary Examiner*—Jose L. Couso
*Assistant Examiner*—Duy M. Dang
*Attorney, Agent, or Firm*—Smith, Danamraj & Youst; Lawrence R. Youst

[57] ABSTRACT

A method and system for confidential transmissions of documents over existing telephone communications lines is disclosed that generates encrypted documents suitable for reception by a facsimile machine. The encrypted document can be received by a facsimile device (60) at a distant location and decrypted by its intended recipient with the use of a unique encryptogram (38). The encrypted document can be recognized by existing optical character recognition systems and then modified to minimize the number of characters errors. The original text document is processed to create a unique character set prior to transmission and processed again at the receiving end to convert it into its original plain language format.

20 Claims, 5 Drawing Sheets

SYSTEM AND METHOD FOR SECURED TRANSMISSION OF DATA OVER TELEPHONE COMMUNICATIONS SYSTEM

TECHNICAL FIELD OF THE INVENTION

The invention relates in general to the transmission of data over a network, and, in particular to a system and method for generating an encrypted document for confidential transmission of information over an existing telecommunications network.

BACKGROUND OF THE INVENTION

Without limiting the invention, its background is described in connection with a system that creates an encrypted document which is transmitted over a communications path containing at least two facsimile devices.

Through the years, the Public Switched Telephone Network ("PSTN") has become vital to the transfer of digital information. Modems, telecopiers or facsimile machines have turned the PSTN into an inexpensive and effective way of transmitting and receiving messages, data and other forms of electronic information. Moreover, the increasing use of information services, such as CompuServe, Prodigy and America On Line, and the recent emergence of the Internet as the information highway of choice have made the PSTN a critical and necessary element of the modern electronic-age.

There are many reasons for the increasing use of the PSTN as a means of information transfer including its reliability, low cost of use and worldwide reach. Today, most anyone with a computer, modem and software can gain access to a large volume of information from practically any location where a telephone line outlet can be found. Thus, a point-to-point transfer between any two locations can be easily established and data transferred and received almost instantaneously. An example of this type of transfer would be a facsimile transmission or dial-up modem.

Other methods of electronic information transfer involve the use of the Internet as a way of avoiding the long distance charges associated with point-to-point PSTN transfers. The Internet provides widespread access to an unlimited number of users from an unlimited number of worldwide locations. Individual users, groups and other entities are identified on the Internet by a unique address. A local access hub provides users with an entry point into the Internet network. The local hub acts as the exchange point for both incoming and outgoing data by routing messages to their intended recipients. Since a point-to-point connection is never established, the costs are limited to those charged by the local hub provider and/or a nominal periodic access fee.

Still other methods of information exchange include the use of information services such as CompuServe, Prodigy or American On Line. As with the Internet, a user typically dials into such information services via a local access hub. The user may employ a proprietary software application on a computer which helps the user obtain access. The costs incurred by the user typically include a monthly access fee and a charge corresponding to the total amount of access during a given period.

Whether using a point-to-point transfer, the Internet or the information services described above, there is no existing method of transferring and receiving electronic information with complete confidentiality if a facsimile machine is part of the communications path. Facsimile transmissions have become common place in today's world, yet the use of facsimile equipment compromises the confidentiality of the information since it involves the transfer and receipt of plain language documents. While a document can be stamped "CONFIDENTIAL" in most cases there is no guarantee that the information is received and seen only by its intended recipient. Even where the facsimile device is part of the recipient's computer, there is no guarantee that the intended recipient may not be the only person who has access to the computer.

These concerns are made even more critical when the information being transmitted is highly sensitive, classified or involves priority. Examples of such information include a person's credit card numbers, savings or checking account numbers, billing histories, social security numbers and the like. Traditionally, it has been this concern for information security that has kept mainstream vendors and merchants from placing their goods and services for order on the PSTN via facsimile transmission. Should the user wish to place an order or make a purchase on the PSTN, the user is in essence leaving "carbon" copies of his credit and/or debit history behind for hackers to read, record and use in the future.

Various methods have been proposed to increase the overall security and integrity of the data transmission process on the PSTN. One method involves encryption of the data stream prior to transmission. Encryption involves scrambling the data stream so that the information is uncipherable and unintelligible to anyone who may intercept the data during transmission.

A commonly used encryption method is the Data Encryption Standard (DES) as set forth in Federal Information Processing Standards Publications (FIPs-PUB)-46 (1977). Normally, a DES based algorithm and secret Key are used by a message sender to encrypt the data prior to transmission. Once the data stream arrives at its intended destination, the DES and Key are then used by the recipient to deencrypt the data into an intelligible form. The Key often consists of a 56-bit combination of data which can be interpreted as 16 hexadecimal characters (0–9, and A–F).

Another encryption method involves the use of the RSA algorithm. In operation, an RSA-based program will generate two large prime numbers hundreds of digits long and produce both a "public" key and a "private" key from the numbers to allow encryption and deencryption of electronic messages, respectively. However, RSA encryption has not been popular since the generation and distribution of keys has made it difficult to manage on a widespread basis. Specifically, in an Internet environment where the handling of many transmissions and many users is critical, the use of RSA based programs is impractical.

Prior art systems have been developed to address the problems associated with the secure transmission of data over a network. For example, one approach is the End-To-End Encryption System and Method of Operation disclosed in U.S. Pat. No. 4,578,530 to Zeidler. The '530 patent relates to a method of transmitting DES encrypted Personal Identification Numbers (PIN) for use in conjunction with Automated Teller Machines (ATM) where a user's PIN and other account information are input by a combination of a magnetic strip on a plastic card and by keyboard entry.

However, while the '530 patent operates to increase system security in a network environment involving ATMs, it is not well suited for the electronic transmission of messages on the PSTN where PINs and magnetic cards are unknown elements. Furthermore, while in operation the '530 relies on financial institutions to provide their clients with a specific PIN and magnetic card, it is not well-suited to environments where a plain language document is being transferred over a facsimile machine.

Specifically, none of the conventional prior art systems provide for a reliable and secured method of transmitting sensitive or confidential information from sender to recipient where a facsimile device is part of the communications data path. Conventional prior art systems focus on key generation and distribution processes that are inapplicable where a plain language document is involved.

What is needed is a device and method for creating an encrypted document that can only be deencrypted and viewed by its intended recipient after transmission. Such a device and method would fill the void left by prior art systems.

SUMMARY OF THE INVENTION

The present invention solves many of the problems identified above by providing a method and apparatus for secured transmissions of documents over existing PSTN lines. Transmissions can occur as point-to-point, over available information services, on the Internet or through an intranet, but a principle object of the invention is to provide a system that generates encrypted documents suitable for transfer over PSTN lines and reception by a facsimile device. The encrypted document can be received and deencrypted by the recipient as desired. In this way, only the intended recipient has access to the underlying contents of the documents transmitted.

Another object of the present invention is to provide an apparatus and method of creating encrypted documents that can be recognized by existing Optical Character Recognition ("OCR") systems. In this regard, encrypted data is modified to minimize the number of character errors resulting from OCR. The encrypted document is processed to create a unique character set prior to transmission. At the receiving end, the encrypted and processed document is converted by OCR and deencrypted into its original plain language format.

Another object of the present invention is to provide a system for the transfer of electronic documents with a verification feature that ensures only the intended recipient can deencrypt the document. In this regard, a unique key is used to accomplish the encryption and deencryption functions. The selection of the key is determined by the parties prior to transmission. Alternatively, a unique encryption key is randomly generated and incorporated on encryption software residing both at the transmitting and receiving stations. Upon receipt, the system processes the file and allows the recipient to enter the key prior to deencryption. Alternatively, the file is processed automatically by software on the receiving station and verified to ensure only the intended recipient is deencrypting the file.

More specifically, the present invention is directed to a process for transmitting electronic files comprising, obtaining an electronic file, which is encrypted using an encryption software to produce an encrypted file. The encryption software may use, for example, the Data Encryption Standard or a modified Data Encryption Standard for encrypting the electronic file. An encryptogram is selected between the sending and receiving parties for use in encrypting and deencrypting an electronic file into an encrypted file The encrypted file is then transmitted over PSTN lines, or on the Internet or an intranet, using a facsimile machine. The facsimile machine can be a stand alone facsimile machine or a facsimile machine that is integral with a computer.

The electronic file to be encrypted may be entered by using a keyboard, a mouse or other similar device. Alternatively, the electronic file to be encrypted can be stored in computer memory, or on a storage device such as a diskette, a magnetic tape, a magneto-optical drive or a hard drive, for example.

The encrypted file sent by facsimile transmission is received by a facsimile machine that is a stand alone facsimile machine or is a facsimile machine integral with a computer. The encrypted file received by the facsimile machine is then subjected to an optical character recognition regime, and the output is saved as, for example, a text file. The output may be saved to a disk, kept in memory, displayed on a cathode ray tube or may be printed.

The output from the optical character recognition regime may then be directly deencrypted by deencrypting software using the encryptogram selected by the parties or integral to the software. The encryptogram may be selected by the sending and receiving party or parties prior to each transmission, concurrent with transmission or after transmission.

The output of the optical character recognition regime may be verified using, for example, a longitudinal redundancy check. Alternatively, the output file may be verified manually. After the file has been deencrypted it may be save to disk or memory, or may be displayed on a cathode ray tube or printed.

The present invention also includes an apparatus for transmitting electronic files comprising, a first computer having a first electronic file and encryption software. The first computer encrypts the electronic file using the encryption software to produce an encrypted file. The encryption software uses an encryptogram that is known by the receiving party or parties for encrypting and deencrypting the software.

The encrypted file is then transmitted by a first facsimile over, for example, a PSTN, the Internet or an intranet. A second facsimile device receives the encrypted file. The second facsimile machine may be a stand alone facsimile machine or one integral with a computer.

The encrypted file received may then be stored or subjected to an optical character recognition device, which scans the encrypted file and produces as an output a second electronic file. A second computer receives the second electronic file from the optical character recognition device, and used the correct encryptogram and deencryption software within the second computer to deencrypt the electronic counterpart. The deencrypted file may then be stored, displayed on a cathode ray tube or printed.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
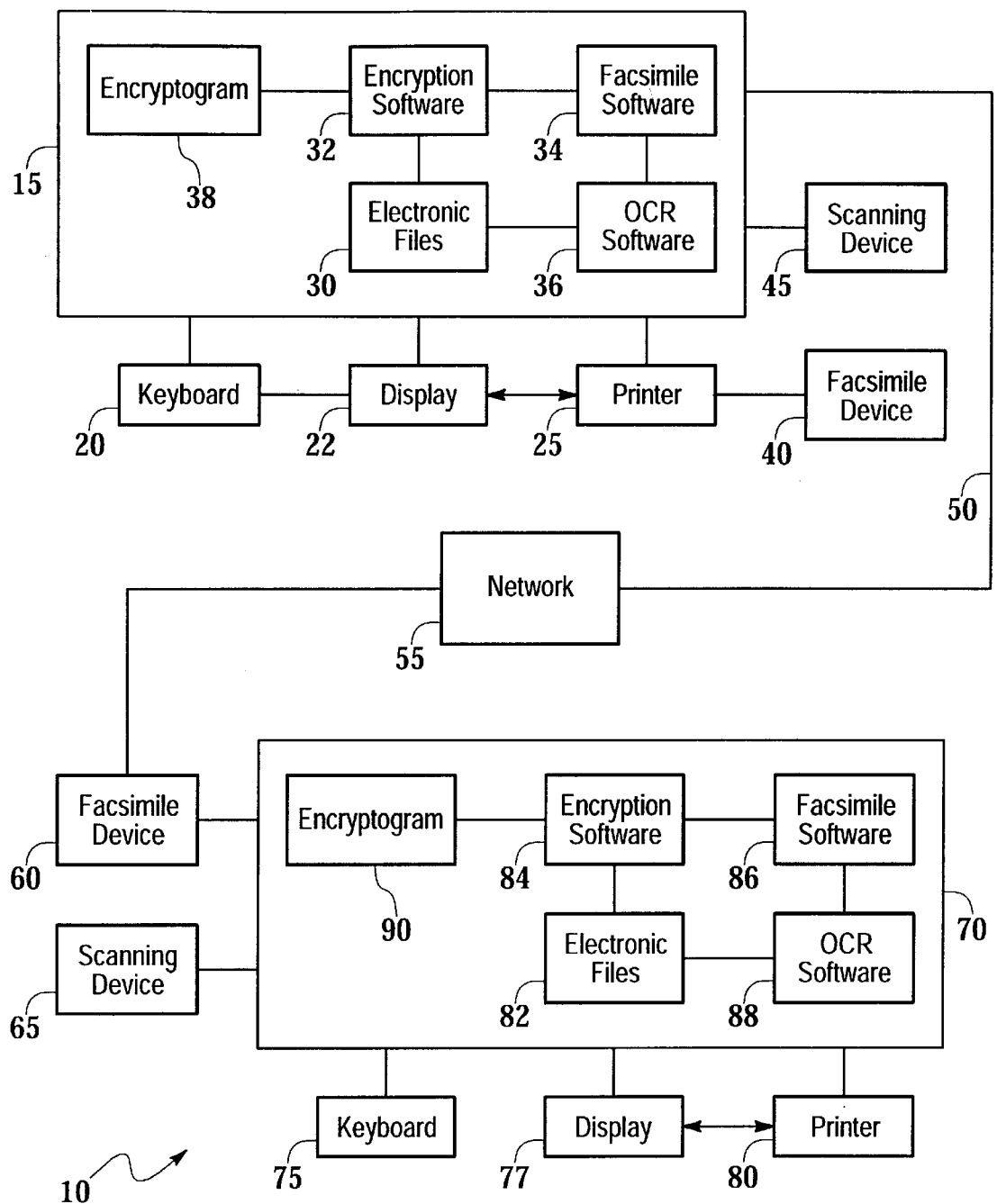
FIG. 1 is a block diagram depicting the overall system in accordance with the present invention.

In FIG. 1, a block diagram of the overall transmission system in accordance with the preferred embodiment of the invention is shown and denoted generally as numeral 10. As shown, transmission system 10 comprises a first station 15 for performing a plurality of functions as herein described. For example, first station 15 gives the user the ability to create, save and edit documents including text, graphics and other forms of electronic data. An input means 20 such as a keyboard, mouse or other similar device can be used to allow entry of the data into first station 15. Alternatively, the electronic file 30 may be obtained from a databank or database of files. First station 15 can take a variety of forms including a desktop or notebook computer, workstation or processing system.

Other functional components of the first station 15 include electronic files 30, encryption software 32, and OCR software 36. Each of these components (30, 32, 36) are required by the first station 15 for creating, decoding, transmitting and scanning documents as herein described. Facsimile software 34 may also be used with the present invention.

The electronic files 30 can take many formats including memos, word processing documents or scanned image files among others file types. Also, electronic files 30 can be stored on a magnetic surface such as a diskette, hard disk drive or other similar medium. In the preferred embodiment, electronic files 30 contains text and alphanumeric characters that can be edited, copied and otherwise manipulated on first station 15.

The encryption software 32 may also be maintained on the first station 15 for encrypting and deencrypting electronic files 30. Various methods of encryption may be used, although in some embodiments the Data Encryption Standard (DES) set forth in Federal Information Processing Standards Publications (FIPs-PUB)-46 (1977) is preferred. Other methods of data encryption may be employed. In any case, the encryption software 32 allows the scrambling of electronic files 30 so that the underlying data is uncipherable and unintelligible to anyone but the those with access to the encryptogram 38.

In the preferred embodiment, encryptogram 38 is a unique identifier associated with first station 15 and is randomly selected by the encryption software 34 to encrypt the document for printing or transmission. The sending and receiving parties are the only two parties whose encryption software 34 and 84 is able to obtain or determine the encryptogram 38. As such, the sending and receiving users are the only ones with access to the information of the encrypted electronic file transmitted. The encryptogram 38 is used by the encryption software 32 during the encryption process prior to printing or transmission of the document and then used by the encryption software 84 to deencrypt the document.

As shown, first station 15 has facsimile software 34 that can be used to control facsimile device 40. Facsimile software 34 and facsimile device 40 may be implemented in a plurality of configurations. For example, in one embodiment, the facsimile device 40 is a fax modem coupled to first station 15. In this configuration, the facsimile software 34 is used to control the operation of facsimile device 40 and permit the user of first station 15 to select an electronic file 30 for transmission via facsimile device 40.

Yet in another configuration, facsimile software 34 and facsimile device 40 are self contained in a single system such as a stand alone facsimile machine. In this case, the user must use printer 22 to obtain a hard copy of the encrypted text document and manually feed the document into facsimile device 40.

First station 15 also has OCR software 36 that provides the scanning functions. For example, a user may want to scan an existing document through scanning device 45. The user may, or may not, OCR the document. No particular type of OCR, or other scanning software, is required to practice the present invention. Therefore, the OCR software 36 providing scanning functionality can be used to scan documents or drawings and stored as electronic files 30. These files can be encrypted by the present invention for facsimile transmission to the second station 70.

The facsimile device 40, or facsimile software 34, is coupled to network 55 via line 50. In this way, the facsimile device 40, or facsimile software 34, can transmit information to second station 70. In the preferred embodiment, the network 55 is the PSTN. In other embodiments, network 55 comprises the Internet. In still another embodiment, network 55 can be an intranet, defined herein as a private switched network over which facsimile device 40, or facsimile software 34, can transmit information.

The second station 70 also has a facsimile device 60, or facsimile software 86, for receiving transmission from first station 15. In operation using facsimile 60, data is received via facsimile device 60 and converted into an encrypted document as output. The encrypted document is scanned in scanning device 65 to produce an electronic file 82, which is transferred to second station 70 for further processing. Using facsimile software 86, the data is received via the PSTN network 55 and an electronic file 82 is produced for further processing. At this point the electronic file 82 is used as input to the OCR software 88. The OCR software 88 produces another electronic file 82 in a text format for input to the encryption software 84. Using the electronic file 82 produced by the OCR software 88, the encryption software 84 scans the file for OCR errors. The encryption software 84 then instructs the user as to the locations of OCR errors so the user can correct such areas using the hardcopy document received from facsimile machine 40 or first station 15. Once all OCR errors are corrected, the encryption software 84 will then determine the encryptogram 90 and use it to deencrypt the electronic file 82. The end result is either displayed on the users display 80 or is stored as an electronic file 82 for viewing with other software products.

Figure 2:
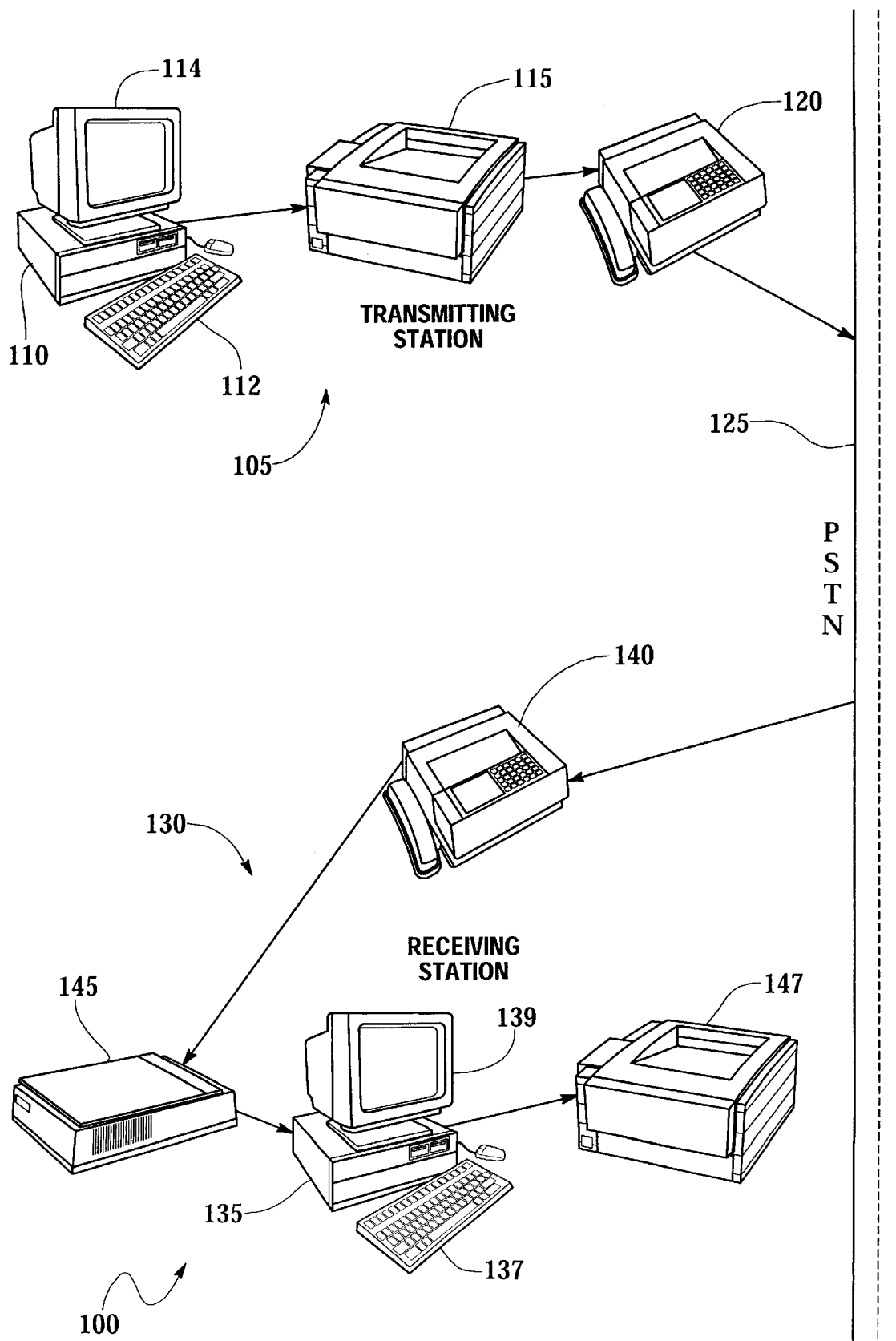
FIG. 2 depicts a specific example of a system for transmitting and receiving encrypted documents in accordance with one embodiment of the invention.

Turning now to FIG. 2, a specific example of the system for transmitting and receiving encrypted documents is shown and denoted generally as numeral 100. System 100 shows that a transmitting station 105 and a receiving station 130 are provided and configured to communicate with each other via the PSTN 125. The hardware components of the transmitting station 105 include computer 110, printer 115 and facsimile machine 120. As shown, computer 110 has a screen display 114 and a keyboard 112 for viewing and entering data on computer 110. Software performing the block functions of FIG. 1 as described above is resident on the computer 110. Likewise, receiving station 130 comprises a computer 135, facsimile machine 140, scanner 145 and printer 147.

In operation, computer 114 of transmitting station 105 encrypts a text document so it is uncipherable and unintelligible to others. The text document is printed on printer 115 and placed into facsimile machine 120. Facsimile machine 120 transmits the encrypted document as a facsimile transmission on PSTN 125 where it is received by facsimile machine 140 to produce a hard copy. A scanner 145 is used to scan the hard copy output of facsimile device 140 and produce an electronic text file of the hard copy. The electronic file is transferred to the computer 135 where it is processed in accordance with the method herein described. In one embodiment, processing includes scan error correction, longitudinal redundancy checking, and deencryption. At this point, the electronic file can be stored, deleted or manipulated in computer 135 or printed on printer 147.

While a specific embodiment of the invention is illustrated in the system 100 of FIG. 2, it should be understood that other configurations may be obtained without departing from the true scope and spirit of the invention.

Figure 3:
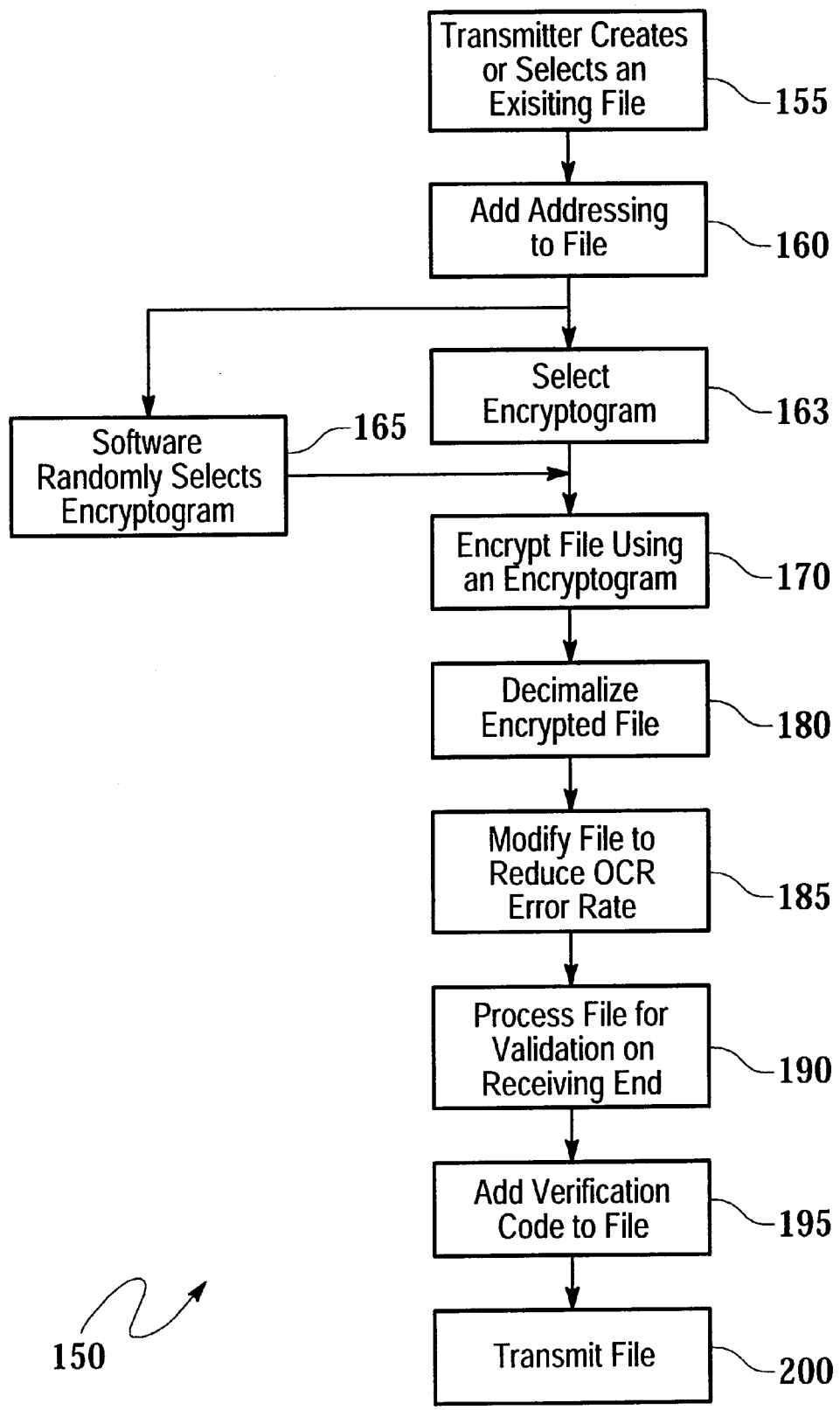
FIG. 3 is a flow diagram of the transmit process in accordance with the present invention.

In reference to FIG. 3, the method of transmitting an encrypted document is illustrated in flow chart form and denoted generally as numeral 150. Method 150 begins when the transmitting station creates a text file 155. Next, the user adds a header as a means of addressing its intended recipient.

As shown, an encryptogram is selected 165 by the user. Step 165 may entail the entry of a unique encryptogram known only by the transmitting party and the receiving party. For example, parties may preselect an encryptogram prior to transmission of the document. The encryptogram would be used during the encryption process prior to transmission and also during deencryption after reception. Alternatively, software at the transmitting station 105 and the receiving station 130 can be configured with the same encryptogram prior to transmission to make the encryption/deencryption process automatic. In this case, the encryptogram can be randomly generated and distributed with the encryption software 32, 84 to users prior to transmission.

The process 150 continues when the file is encrypted 170 using the unique encryptogram selected 165. In one embodiment, a modified DES algorithm is used to perform the encryption step 170. Other methods of encryption are also contemplated. The encrypted file is then decimalized 180 to create a file with characters 0–9 and A–F. Step 180 simplifies the character stream of the document and permits simplified character recognition at the receiving station 130.

Further processing includes modifying the file to reduce the OCR error rate 185 by creating the most unique character set possible and thus increasing the accuracy of the scanning process at the receiving station 130. For example, in one embodiment step 185 involves changing a "B" to an "X", "C" to "J" and "F" to "P". This step 185 reduces the OCR error rate by permitting the OCR software 88 at the receiving station 70 to distinguish between an "8" and a "B", "0" and "C" and "E" and "F".

Next, the file is validated 190 by Longitudinal Redundancy Check ("LRC") or other similar technique that will permit the receiving station 130 to determine data integrity by comparing the received file to the file that was transmitted. In step 190, an LRC code and/or other verification codes are added 195 to the file for validation at the receiving end. Finally, the file is transmitted 200 to its intended recipient using facsimile device 40, line 50 and network 55. Other methods of transmitting the document to the second station 70 are also contemplated.

Figure 4:
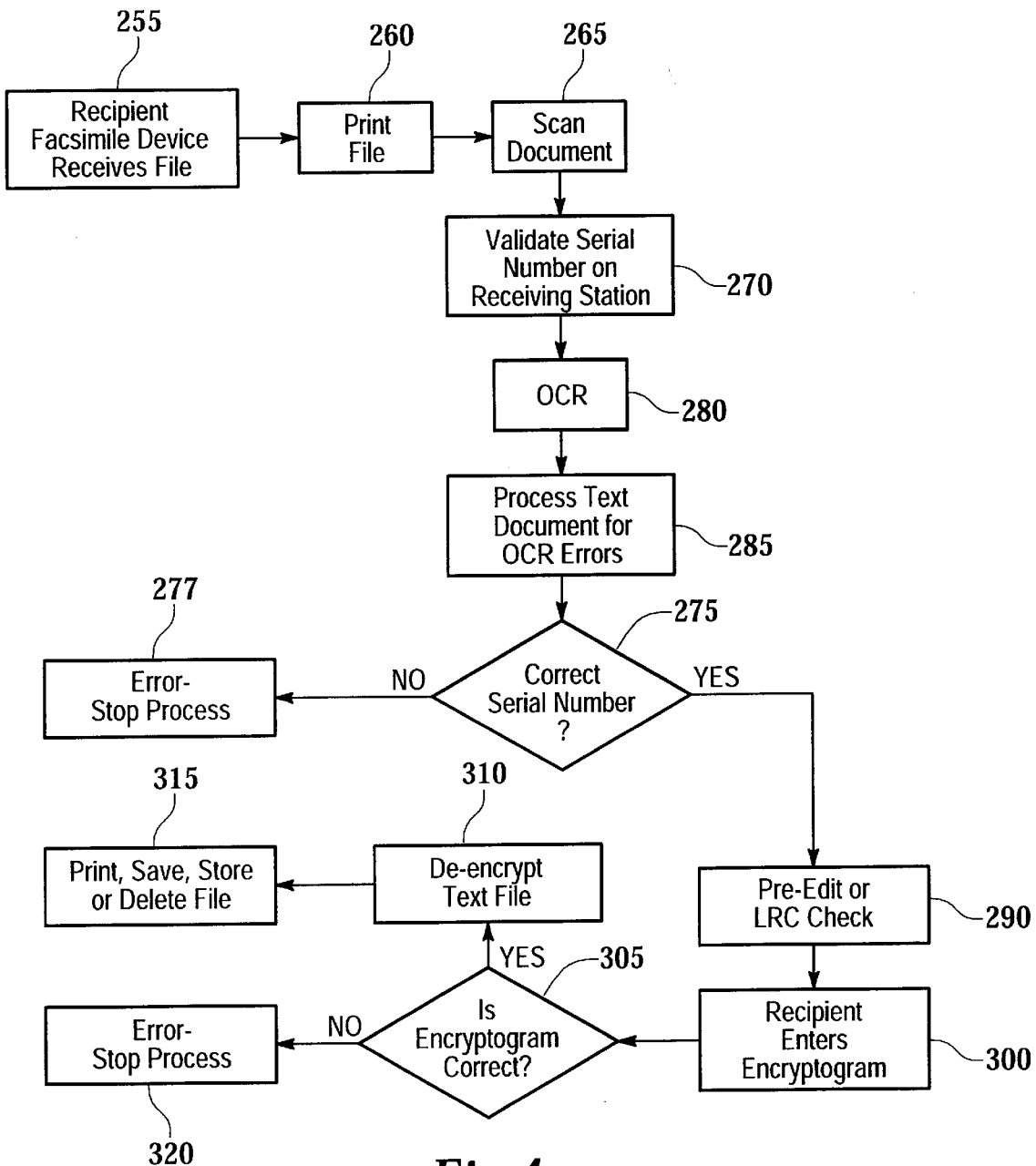
FIG. 4 is a flow diagram of the receive process in accordance with the present invention.

Turning to FIG. 4, the method of receiving encrypted document is illustrated in flow chart form and denoted generally as numeral 250. Process 250 begins when the receiving facsimile device 60 receives the encrypted file 255. Facsimile device 60 can perform this function and create a hard copy output 260 of the encrypted document. At this point the encrypted document is in an unintelligible format. Next, the document is scanned 265 by a device such as scanning device 65. No particular type of scanning device 65 is called for by the invention.

In one embodiment of the invention, a serial number is present on the receiving station 70 corresponding to a unique copy of the encryption software 84. The serial number is by the encryption software 84 on the receiving station 70 to ensure an authorized system has received the encrypted file.

Process 250 continues with step 280 wherein the scanned document is processed by an OCR 280 program to create a character text file. Since the encrypted file was decimalized 180 prior to transmission, the resulting text file will contain characters 0–9 and A–F. The text file is processed for OCR errors 285. At this points, errors in the text file may be present so the encryption software 84 gives the user the option of editing 290 the text files to correct simple errors.

In this embodiment, the serial number is encrypted with the file at the transmission station 15 and a comparison is made 275 between the file's serial number and the serial number encrypted with the software. If the numbers do not compare, an error condition occurs 277 and the process 250 is terminated. If the numbers do compare, process 250 moves on to step 290. Step 290 involves performing LRC checking to increase the integrity of the data file. Steps 285 and 290 may be repeated until all errors in the scanned document are corrected.

Process 250 continues when the intended recipient enters the unique encryption key 300 to permit the encryption software 84 to deencrypt the file. In another embodiment, the encryption software compares the encryptogram 38 from first station 15 automatically with the encryptogram 38 at second station 70. If so, the file is deencrypted 310 to create a plain language formatted document, which the intended recipient can read.

Figure 5:
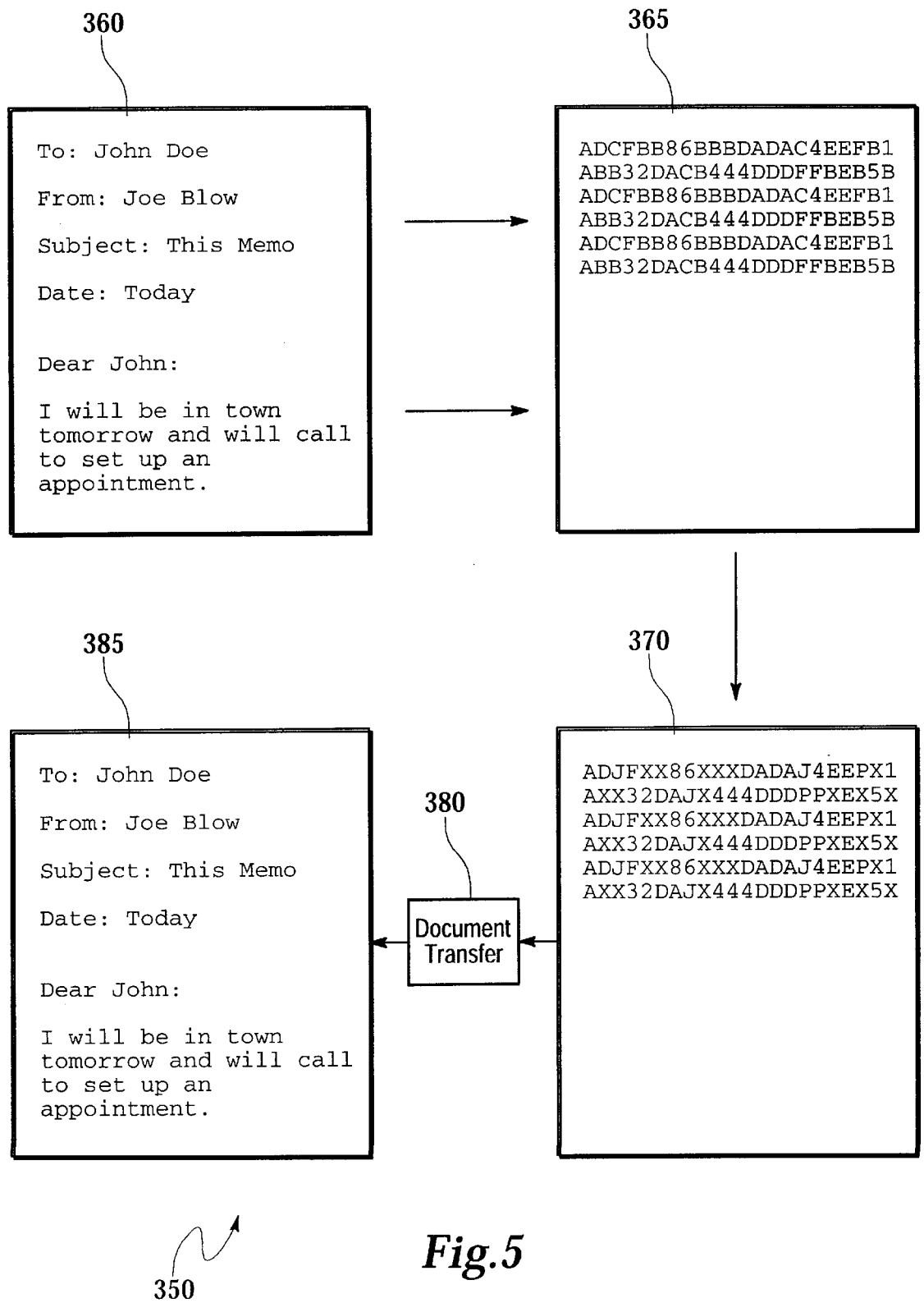
FIG. 5 illustrates the document encryption/deencryption process at various stages of processing in accordance with one embodiment of the invention.

In FIG. 5, the document encryption process at various stages is demonstrated and denoted generally as 350. Encryption process 350 begins with an existing text file 360 in a plain language format that can be read by others. Next, the document is encrypted via existing encryption methods as herein described and an uncipherable document 365 is created. It should be understood that document 365 is provided as an example and that document 365 is not representative of an actual encrypted text file. As shown, document 365 has only characters A–F and 0–9, but other character sets may be employed.

Next, the document 365 is processed to reduce OCR error rates by replacing certain characters in document 365 with more unique and distinguishable character. The result is document 370. At this point the document is transmitted 380 to its intended recipient and converted to it original text format 385 in accordance with the method herein described.

It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A process for transmitting electronic files in a confidential manner over a communications path containing a first and second facsimile device, said process comprising the steps of:

electronically encrypting an electronic information file using a preselected encryptogram;

printing as encrypted text the contents of said encrypted electronic information file to create an indecipherable hard copy;

using said first facsimile device to transmit said hard copy to an intended recipient;

receiving an image of said hard copy at said second facsimile device;

creating a hard copy output of said image;

placing said output in an optical character recognizer to create an electronic counterpart of said output; and using the said encryptogram to decrypt the electronic counterpart and create a decipherable message.

2. The process for transmitting electronic files according to claim 1 wherein said electronic information file is input by a user with a keyboard.

3. The process for transmitting electronic files according to claim 1 wherein said electronic information file is stored on a magnetic storage device.

4. The process for transmitting electronic files according to claim 3 wherein said magnetic storage device is a diskette or a hard drive.

5. The process for transmitting electronic files according to claim 1 wherein said electronic files are encrypted and decrypted using the Data Encryption Standard.

6. The process for transmitting electronic files according to claim 1 wherein said communications path uses the public switched telephone network.

7. The process for transmitting electronic files according to claim 1 wherein said communications path uses the Internet.

8. The process for transmitting electronic files according to claim 1 wherein said first and second facsimile devices are inside a computer.

9. The process for transmitting electronic files according to claim 1 wherein said process further comprises the step of printing said decipherable message.

10. The process for transmitting electronic files according to claim 1 wherein said process further comprises the step of displaying said decipherable message on a computer screen.

11. The process for transmitting electronic files according to claim 1 wherein said electronic information files are validated prior to transmission using a longitudinal redundancy check.

12. The process for transmitting electronic files according to claim 1 wherein said electronic counterpart is manually corrected to remove any errors remaining after optical character recognition.

13. An apparatus for transmitting and receiving electronic files confidentially over an unsecured communications link, said apparatus comprising:

a first computer having an input means and a storage means for storing said files;

encryption software in said first computer having the functionality to select any one of said electronic files and encrypting said electronic files to create an indecipherable message;

a first facsimile device for transmitting said indecipherable message to an intended recipient;

a communications pathway connecting said first facsimile device to a second facsimile device that receives said indecipherable message;

an optical character recognition system for recognizing characters contained within said indecipherable message and producing an electronic counterpart of said indecipherable message;

a second computer for receiving said electronic counterpart from said optical character recognition device; and decryption software within said second computer for decrypting said electronic counterpart.

14. The apparatus for transmitting electronic files according to claim 13 wherein said electronic file is input by a keyboard, a mouse or other similar device.

15. The apparatus for transmitting electronic files according to claim 13 wherein said electronic storage is a magnetic diskette or a hard disk drive.

16. The apparatus for transmitting electronic files of claim 13 wherein the encryption software employs the Data Encryption Standard.

17. The apparatus for transmitting electronic files according to claim 13 wherein the public switched telephone network is used to transmit files between said first and second facsimile devices.

18. The apparatus for transmitting electronic files according to claim 13 wherein the Internet is used to transmit files between said first and second facsimile devices.

19. The apparatus for transmitting electronic files of claim 13 further comprising an intranet transmission line for carrying said encrypted file between said first and second facsimile machines.

20. The apparatus for transmitting electronic files of claim 13 further comprising a printer for printing said electronic counterpart.

* * * * *